US006993719B1

(12) United States Patent
Edwards et al.

(10) Patent No.: US 6,993,719 B1
(45) Date of Patent: Jan. 31, 2006

(54) SYSTEM AND METHOD FOR ANIMATED CHARACTER PHOTO-EDITING INTERFACE AND CROSS-PLATFORM EDUCATION ICON

(75) Inventors: Eric Edwards, San Francisco, CA (US); Neal Jacob Manowitz, Mahwah, NJ (US); Robert Jay Sato, Fort Lee, NJ (US); John Tree, San Francisco, CA (US); Clay Harvey Fisher, Belmont, CA (US); Kurt Jonach, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 604 days.

(21) Appl. No.: 09/727,835

(22) Filed: Nov. 30, 2000

Related U.S. Application Data

(60) Provisional application No. 60/181,840, filed on Feb. 11, 2000, provisional application No. 60/181,787, filed on Feb. 11, 2000.

(51) Int. Cl.
*G06F 17/00* (2006.01)
(52) U.S. Cl. ............... 715/706; 715/705; 715/709; 715/715
(58) Field of Classification Search ........... 345/163, 345/610, 660, 661, 705, 730, 763, 473–475, 345/419, 706, 500; 700/232; 709/203, 224; 715/707, 723, 705, 706, 709–711, 715
See application file for complete search history.

(56) References Cited

U.S. PATENT DOCUMENTS

| 3,785,721 A | 1/1974 | Harsch |
| 4,485,409 A | 11/1984 | Schumacher |
| 4,707,742 A | 11/1987 | Field et al. |
| 4,902,128 A | 2/1990 | Siebecker et al. |
| 4,905,294 A | 2/1990 | Sugiura et al. |
| 4,907,086 A | 3/1990 | Truong |
| 4,942,391 A | 7/1990 | Kikuta |
| 4,954,970 A | 9/1990 | Walker et al. |
| 5,019,858 A | 5/1991 | Suzuki |
| 5,099,331 A | 3/1992 | Truong |

(Continued)

FOREIGN PATENT DOCUMENTS

EP    2002-521850    12/2000

(Continued)

OTHER PUBLICATIONS

Yagawa, et al., "The Digital Album: A Personal File-tainment System", Proceedings of MULTIMEDIA '96, pp. 433-439.

(Continued)

*Primary Examiner*—Ba Huynh
*Assistant Examiner*—Truc Tung Chuong
(74) *Attorney, Agent, or Firm*—Blakely, Sokoloff, Taylor & Zafman LLP (57) ABSTRACT

A system and method for indicating suggested user responses is disclosed. The method includes loading an image into image-editing equipment. The method further includes determining a set of quality-related problems of the image using software. An animated icon is displayed in conjunction with the image, and indicates a suggested user response to one of the quality-related problems. Other embodiments may include matching a corrective function with one of said set of quality-related problems, and indicating the suggested user response in response to the matching. Further embodiments may perform the indicating by having the animated icon proffer a tool icon, or by performing a related editing to the animated icon. Finally, in other embodiments the method may include moving the animated icon to alternate image-editing equipment.

60 Claims, 10 Drawing Sheets

U.S. PATENT DOCUMENTS

| | | |
|---|---|---|
| 5,187,754 A | 2/1993 | Currin et al. |
| 5,193,000 A | 3/1993 | Lipton et al. |
| 5,270,806 A | 12/1993 | Venable et al. |
| 5,325,449 A | 6/1994 | Burt et al. |
| 5,327,521 A | 7/1994 | Savic et al. |
| 5,442,759 A | 8/1995 | Chiang et al. ............. 395/375 |
| 5,465,163 A | 11/1995 | Yoshihara et al. |
| 5,488,674 A | 1/1996 | Burt et al. |
| 5,524,071 A | 6/1996 | Yokomizo |
| 5,561,745 A | 10/1996 | Jackson et al. |
| 5,606,656 A | 2/1997 | Yamaguchi |
| 5,611,028 A | 3/1997 | Shibasaki et al. |
| 5,629,988 A | 5/1997 | Burt et al. |
| 5,630,037 A | 5/1997 | Schindler |
| 5,649,032 A | 7/1997 | Burt et al. |
| 5,682,326 A | 10/1997 | Klingler et al. |
| 5,684,942 A | 11/1997 | Kimura |
| 5,687,332 A * | 11/1997 | Kurahashi et al. .......... 715/706 |
| 5,694,331 A | 12/1997 | Yamamoto et al. |
| 5,706,368 A | 1/1998 | Mita |
| 5,727,174 A | 3/1998 | Aparicio, IV et al. ...... 395/348 |
| 5,732,146 A | 3/1998 | Yamada et al. |
| 5,732,161 A | 3/1998 | Kuroda et al. |
| 5,732,216 A | 3/1998 | Logan et al. |
| 5,751,848 A | 5/1998 | Farrell |
| 5,777,614 A * | 7/1998 | Ando et al. ................. 715/729 |
| 5,831,590 A | 11/1998 | Ikedo |
| 5,831,617 A | 11/1998 | Bhukhanwala ............... 345/349 |
| 5,835,087 A * | 11/1998 | Herz et al. .................. 345/810 |
| 5,838,837 A | 11/1998 | Hirosawa et al. |
| 5,838,839 A | 11/1998 | Seki et al. |
| 5,841,899 A | 11/1998 | Ide et al. |
| 5,848,183 A | 12/1998 | Farrell |
| 5,850,474 A | 12/1998 | Fan et al. |
| 5,852,683 A | 12/1998 | Jewel |
| 5,861,871 A | 1/1999 | Venable |
| 5,881,166 A | 3/1999 | Farrell |
| 5,881,182 A | 3/1999 | Fiete et al. |
| 5,905,819 A | 5/1999 | Daly |
| 5,920,657 A | 7/1999 | Bender et al. |
| 5,933,524 A | 8/1999 | Schuster et al. |
| 5,937,734 A | 8/1999 | Stiefel et al. |
| 5,970,183 A | 10/1999 | Amemiya et al. |
| 5,973,734 A | 10/1999 | Anderson |
| 5,974,198 A | 10/1999 | Hamburg et al. |
| 5,978,519 A | 11/1999 | Bollman et al. |
| 5,982,931 A | 11/1999 | Ishimaru |
| 5,982,951 A | 11/1999 | Katayama et al. |
| 5,987,166 A | 11/1999 | Hayashi et al. |
| 5,999,662 A | 12/1999 | Burt et al. |
| 6,000,832 A * | 12/1999 | Franklin et al. ............. 700/232 |
| 6,014,471 A | 1/2000 | Barkan et al. |
| 6,016,354 A | 1/2000 | Lin et al. |
| 6,016,356 A | 1/2000 | Ito et al. |
| 6,018,600 A | 1/2000 | Levin et al. |
| 6,020,886 A | 2/2000 | Jacober et al. ............. 345/338 |
| 6,026,183 A | 2/2000 | Talluri et al. |
| 6,026,200 A | 2/2000 | Okude et al. |
| 6,028,583 A | 2/2000 | Hamburg |
| 6,028,958 A | 2/2000 | Kanamori |
| 6,032,156 A | 2/2000 | Marcus |
| 6,034,759 A | 3/2000 | Enomoto |
| 6,052,492 A | 4/2000 | Bruckhaus |
| 6,061,471 A | 5/2000 | Coleman, Jr. |
| 6,067,095 A | 5/2000 | Danieli |
| 6,069,707 A | 5/2000 | Pekelman |
| 6,083,158 A | 7/2000 | Bearman et al. |
| 6,097,389 A | 8/2000 | Morris et al. |
| 6,104,441 A | 8/2000 | Wee et al. |
| 6,109,923 A | 8/2000 | Rothenberg |
| 6,112,226 A | 8/2000 | Weaver et al. |
| 6,123,362 A | 9/2000 | Squilla et al. |
| 6,125,385 A * | 9/2000 | Wies et al. .................. 345/163 |
| 6,154,755 A | 11/2000 | Dellert et al. |
| 6,169,854 B1 * | 1/2001 | Hasegawa et al. ............ 396/56 |
| 6,192,183 B1 | 2/2001 | Taniguchi et al. |
| 6,195,458 B1 | 2/2001 | Warnick et al. |
| 6,201,548 B1 | 3/2001 | Cariffe et al. |
| 6,215,498 B1 * | 4/2001 | Filo et al. .................... 345/419 |
| 6,222,947 B1 | 4/2001 | Koba |
| 6,256,451 B1 | 7/2001 | Mitsui |
| 6,301,440 B1 | 10/2001 | Bolle et al. |
| 6,301,555 B2 | 10/2001 | Hinderks |
| 6,307,979 B1 | 10/2001 | Kondo et al. |
| 6,313,902 B1 | 11/2001 | Enomoto |
| 6,324,545 B1 | 11/2001 | Morag |
| 6,329,994 B1 * | 12/2001 | Gever et al. ................. 345/473 |
| 6,344,903 B1 | 2/2002 | Derhak et al. |
| 6,351,321 B1 | 2/2002 | McIntyre et al. |
| 6,358,055 B1 | 3/2002 | Rothenberg |
| 6,359,270 B1 * | 3/2002 | Bridson ...................... 345/156 |
| 6,388,732 B1 | 5/2002 | Williams et al. |
| 6,396,963 B2 | 5/2002 | Shaffer et al. |
| 6,407,777 B1 | 6/2002 | DeLuca |
| 6,424,789 B1 | 7/2002 | Abdel-Mottaleb |
| 6,434,579 B1 | 8/2002 | Shaffer et al. |
| 6,437,306 B1 | 8/2002 | Melen |
| 6,441,854 B2 | 8/2002 | Fellegara et al. |
| 6,484,189 B1 * | 11/2002 | Gerlach et al. ............. 345/763 |
| 6,496,851 B1 | 12/2002 | Morris et al. |
| 6,522,351 B1 | 2/2003 | Park |
| 6,526,215 B2 | 2/2003 | Hirai et al. |
| 6,552,743 B1 | 4/2003 | Rissman |
| 6,567,825 B2 | 5/2003 | Bogia |
| 6,567,980 B1 | 5/2003 | Jain et al. |
| 6,567,983 B1 | 5/2003 | Shiimori |
| 6,577,311 B1 | 6/2003 | Crosby et al. |
| 6,577,760 B1 | 6/2003 | Ohta et al. |
| 6,587,596 B1 | 7/2003 | Haeberli |
| 6,590,584 B1 | 7/2003 | Yamaura et al. |
| 6,590,586 B1 | 7/2003 | Swenton-Wall et al. |
| 6,608,650 B1 * | 8/2003 | Torres et al. ............... 715/709 |
| 6,631,522 B1 | 10/2003 | Erdelyi |
| 6,633,689 B2 | 10/2003 | Yamamoto |
| 6,647,125 B2 | 11/2003 | Matsumoto et al. |
| 6,647,126 B1 | 11/2003 | Wen |
| 6,668,134 B1 | 12/2003 | Niikawa |
| 6,701,011 B1 | 3/2004 | Nakajima |
| 6,819,449 B2 | 11/2004 | Haneda et al. |
| 6,912,311 B2 | 6/2005 | Anderson et al. |
| 2002/0118182 A1 | 8/2002 | Weindorf et al. |

FOREIGN PATENT DOCUMENTS

| | | |
|---|---|---|
| JP | 60-003797 | 2/1985 |
| JP | 63-228304 | 9/1988 |
| JP | 11-119688 | 4/1999 |
| KR | 2001046229 | 6/2001 |

OTHER PUBLICATIONS

England et al. I/Browse: The Bellcore Video Library Toolkit, Storage and Retrieval for Still Image and Video Databases IV. SPIE, vol. 2670, pp. 254-264, 1996.

Game Commander™ ("Game Commander User's Guide" © 1998, Mindmaker).

Accessability Options ("Assistive Computer Technology for Windows 98™ Training Manuial", High Tech Center Training Unit of the California Community Colleges at the Foothill-DeAnza Community Columnlege District, Cupertino, CA, Jul. 2000.

* cited by examiner

SYSTEM AND METHOD FOR ANIMATED CHARACTER PHOTO-EDITING INTERFACE AND CROSS-PLATFORM EDUCATION ICON

CROSS-REFERENCE TO RELATED APPLICATIONS

This application claims the benefit of the filing date of U.S. provisional patent application, entitled "Animated Character Photo Editing Interface", Ser. No. 60/181,840, filed Feb. 11, 2000, and further claims the benefit of the filing date of U.S. provisional patent application, entitled "Cross Platform Education Icon", Ser. No. 60/181,787, filed Feb. 11, 2000.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000, Sony Electronics Inc., All Rights Reserved.

BACKGROUND OF THE INVENTION (1) Field of the Invention

The present invention relates to the field of digital photography. In particular, the present invention relates to an apparatus and a method for showing a user how to operate photo-editing software in either a workstation or in a digital camera.

(2) Description of Related Art

Image editing is a process that may entail a large number of potential procedures. There may be dozens of types of edits that may be used, such as correcting for exposure, color balance, cropping, and many other attributes of a photographic or other image. Furthermore, the editing may take place at different stages of the photographic process. It may take place within a digital camera, within a workstation, or over the Internet at a remote user's station. In past embodiments of editing software, different user interfaces have been used during each procedure of the process. This has made learning and using the different editing software more difficult and time consuming. Therefore, a method for presenting photo editing for user convenience is at issue in photo-editing systems.

SUMMARY OF THE INVENTION

A system and method for indicating suggested user responses is disclosed. The method includes loading an image into an image-editing equipment. The method further includes determining a set of quality-related problems of the image using software. An animated icon is displayed in conjunction with the image, and indicates a suggested user response to one of the quality-related problems. Other embodiments may include matching a corrective function with one of said set of quality-related problems, and indicating the suggested user response in response to the matching. Further embodiments may perform the indicating by having the animated icon proffer a tool icon, or by performing a related editing to the animated icon. Finally, in other embodiments the method may include moving the animated icon to an alternate image-editing equipment.

BRIEF DESCRIPTION OF THE DRAWINGS

The features, aspects, and advantages of the present invention will become more fully apparent from the following detailed description, appended claims, and accompanying drawings in which:

DETAILED DESCRIPTION

In the following description, numerous specific details are set forth to provide a thorough understanding of the present invention. However, one having an ordinary skill in the art will be able to practice the invention without these specific details. In some instances, well-known circuits, structures, and techniques have not been shown in detail to not unnecessarily obscure the present invention.

An animated character is used for photo-editing. This animated character may look for potential problems in a photographic image, and then demonstrate a chosen corrective function by example. As more people wish to take advantage of the superior functionality of digital cameras, potential problems will occur because editing images can be a confusing and complicated process. This invention seeks to provide a means to simplify and enhance both the user experience and the end result that should be a printed or displayed image. The idea is to create an animated character that would operate in conjunction with an image editing software module, either on a computer, in a camera, or in another device. The character could even move between devices to demonstrate how a function or operation could be achieved on each device. In order to enhance the user experience, the software module could first look for potential problem areas in the image, such as over-exposure or improper color balance. The animated character could then indicate the area of concern to the user and suggest possible corrective functions. To further enhance this interaction, the character could demonstrate the function by adjusting, for example, the brightness on the image, or the character itself could become brighter or darker. In another example, with image cropping, the character could appear with a pair of scissors and demonstrate a cutting motion, or the character itself could have its top and bottom "cropped" to demonstrate the effect. To further enhance the user experience, the user could modify the personality of the character to suit the user.

An integrated user interface in the form of an icon character is used that guides, educates, and entertains by moving across devices and indicating actions being executed. Digital image editing and data transfer is a complicated, time-consuming process. This icon character may not only educate the novice user, but may also entertain the user during a time-consuming computational process. A unique feature is the ability of this tutorial character to move from device to device (i.e. from computer to camera and back again). Although some computerized tutorial characters do exist, this one is unique because, among other things, it can travel across devices. Therefore, the end user does not have to invest any extra time learning to work with a different tutor for each new context. Target applications for the animated icon may be software algorithms on any device that accept parametrical input that describes the character's appearance, as well as its associated information.

Figure 1:
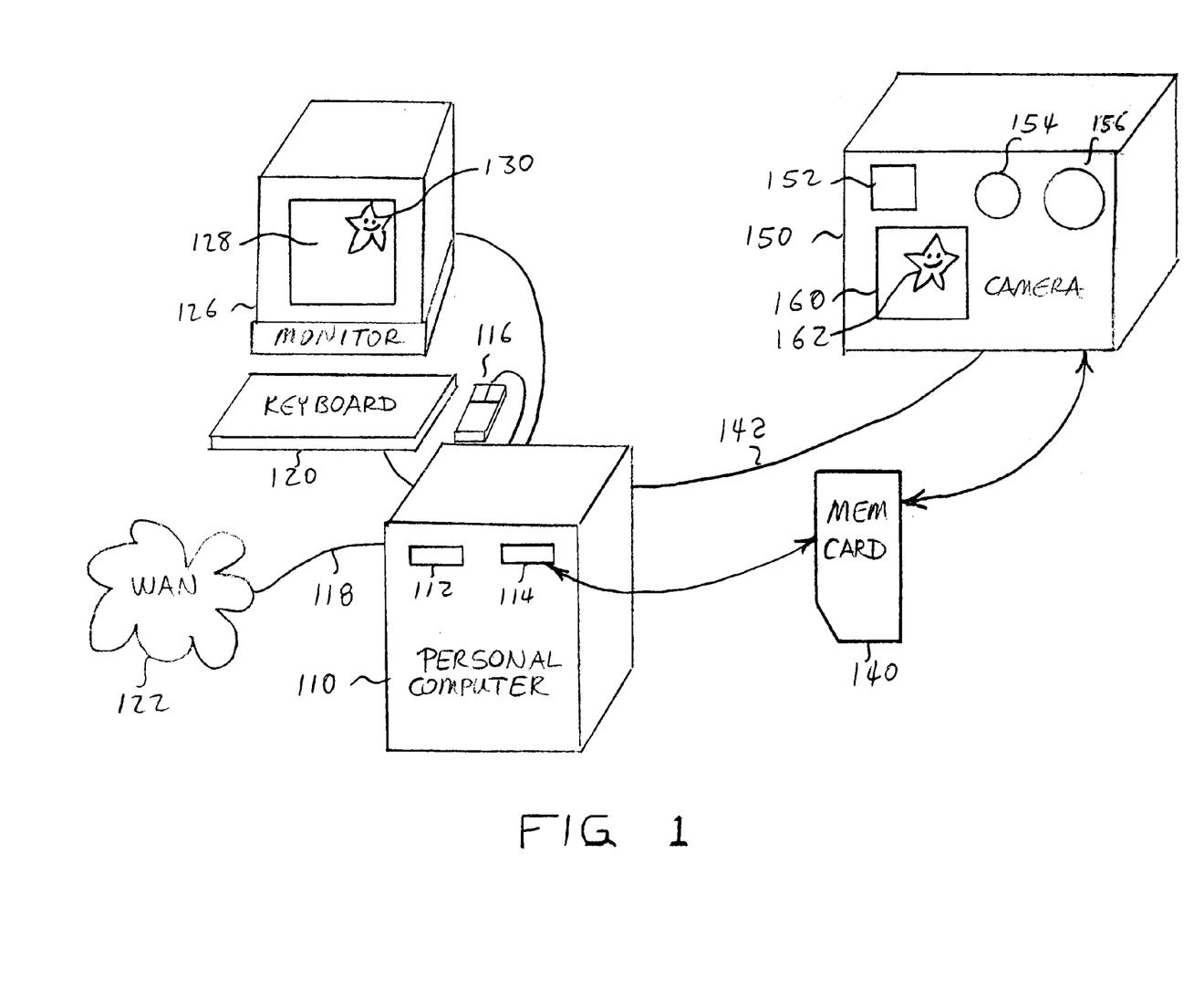
FIG. 1 is a block diagram of a photo editing and camera system, according to one embodiment of the present invention.

Referring now to FIG. 1, a block diagram of a photo editing and camera system is illustrated, according to one embodiment of the present invention. Personal computer 110 may be used in a workstation configuration with monitor 126, keyboard 120, and mouse 116 to edit photos or other images which may be taken with camera 150. Data may be exchanged between personal computer 110 and camera 150 via a local interconnect, which in one embodiment is Universal Serial Bus (USB) 142, or may be physically exchanged via a transportable memory card 140. Memory card 140 may be one of several common formats, such as SmartMedia, Memory Stick, or PC Card.

Personal computer 110 may include removable media 112, which may be a removable magnetic disk, optical disk, or tape, and provide a memory card mount 114 to receive memory card 140. Personal computer 110 may be connected via an interface 118 to a wide-area network (WAN) 122. In one embodiment, WAN 122 is the Internet.

Camera 150 may include a liquid-crystal display (LCD) 160, a viewfinder 152, a pushbutton control 154, and a rotary switch control 156.

Personal computer 110 may display photos or other images on the display screen 128 of monitor 126. Camera 150 may display photos or other images on the LCD 160. In each case, an animated icon 130 or 162, is displayed on display screen 128 or LCD 160, respectively. Animated icon 130, 162 may guide a user in the photo or other image editing process.

Figure 2:
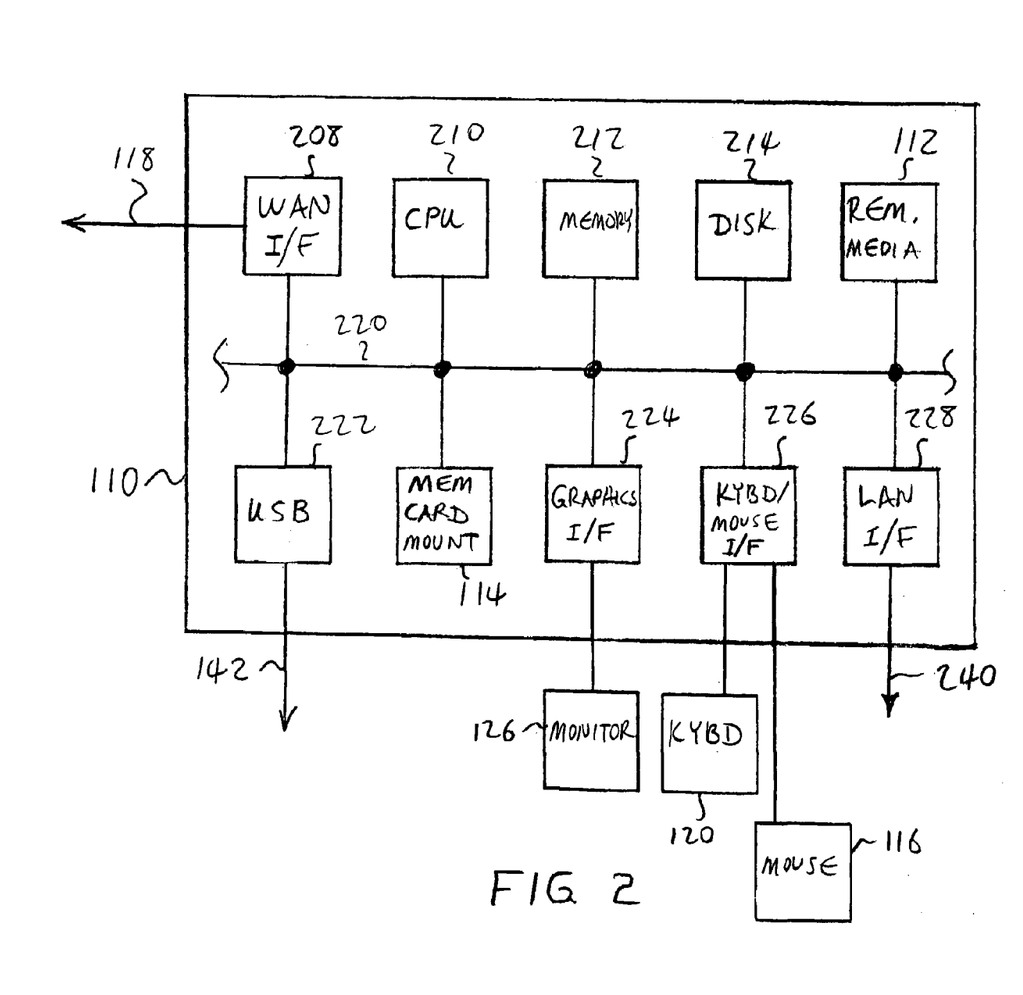
FIG. 2 is a block diagram of a photo editing system, according to the FIG. 1 embodiment of the present invention.

Referring now to FIG. 2, a block diagram of a photo editing system is illustrated, according to the FIG. 1 embodiment of the present invention. Personal computer 110 may include a WAN interface 208, a central processing unit (CPU) 210, a memory 212, a system disk 214, a removable media 112, a USB interface 222, a memory card mount 114, a graphics interface 224 supplying monitor 126, a keyboard/ mouse interface 226 supplying keyboard 120 and mouse 116, and a local area network (LAN) interface 228. These functional units may be connected via a system bus 220. Memory 212 may include volatile random-access memory (RAM), programmable read-only memory (PROM), non-volatile Flash memory, or any other kind of memory. Removable media 112 may be a floppy disk, a removable magnetic disk, an optical or magneto-optical disk, semiconductor memory, or magnetic tape.

In one embodiment, the image displayed upon monitor 126 is processed by software stored locally in memory 212 or on system disk 214. In other embodiments, the software may be stored and executed on a remote server (not shown) connected via WAN 122, which may be the Internet. In the case the software is stored on the remote server, the user of personal computer 110 may not need to purchase a license for the software. In one embodiment, the use of the software is paid for by revenues generated by banner advertisements on pages accessible through WAN 122. User access of the software may trigger payments by the advertiser to the host of the banner advertisements. In an alternate embodiment, the use of the software is paid for on a per-transaction basis by the user of personal computer 110. This per-transaction payment may be made by cash, by a user account, or by redeeming bonus credits from various web-based businesses.

Figure 3:
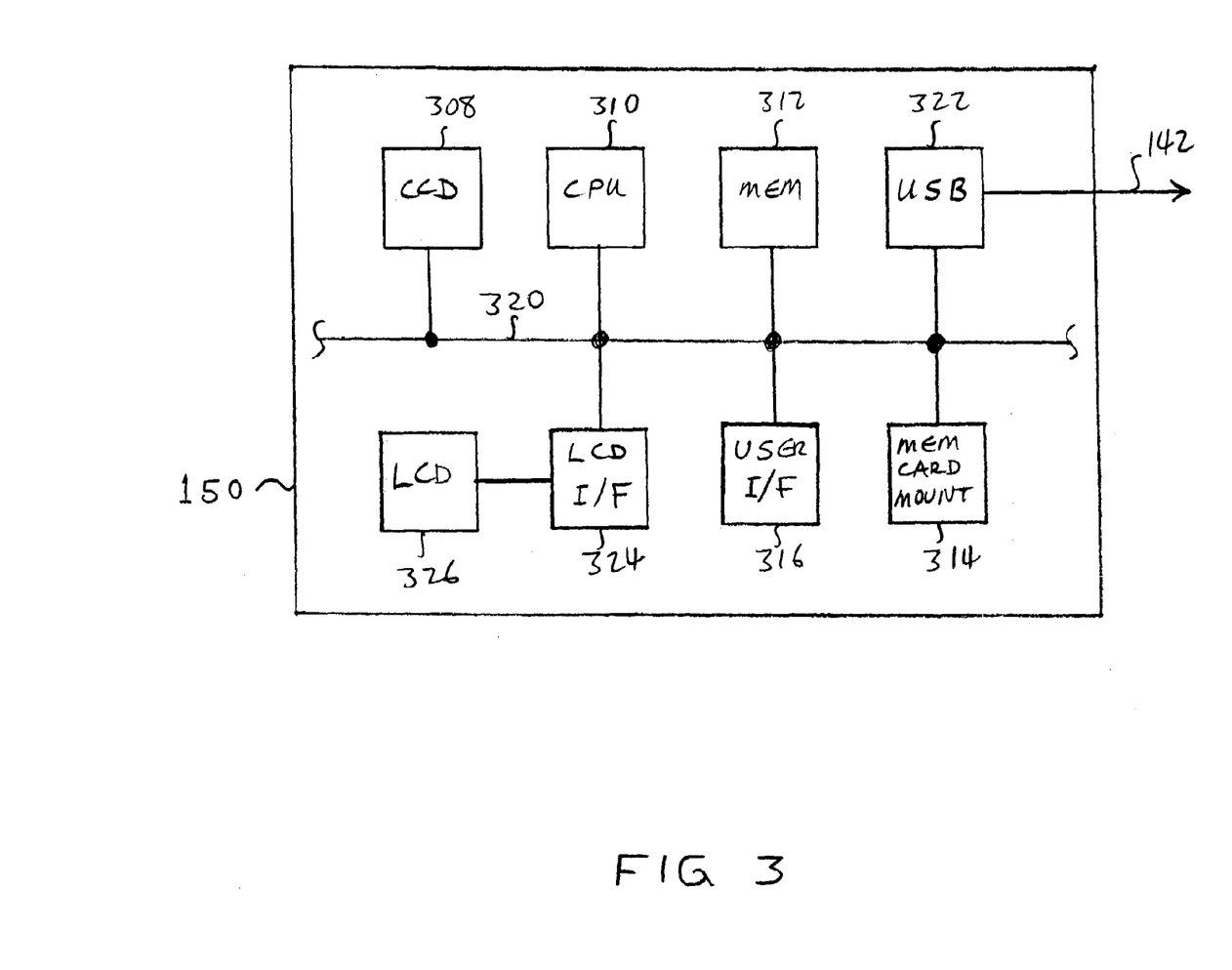
FIG. 3 is a block diagram of a camera, according to the FIG. 1 embodiment of the present invention.

Referring now to FIG. 3, a block diagram of a camera 150 is illustrated, according to the FIG. 1 embodiment of the present invention. Camera 150 may include a charge-coupled device (CCD) 308 for image capture, a CPU 310, memory 312, a USB interface 322, a memory card mount 314, a user interface 316 for supporting the actions of pushbutton control 154 or rotary switch control 156, and a LCD interface 324 supporting the display upon LCD 326. The functional units may be connected via a system bus 320.

Figure 4:
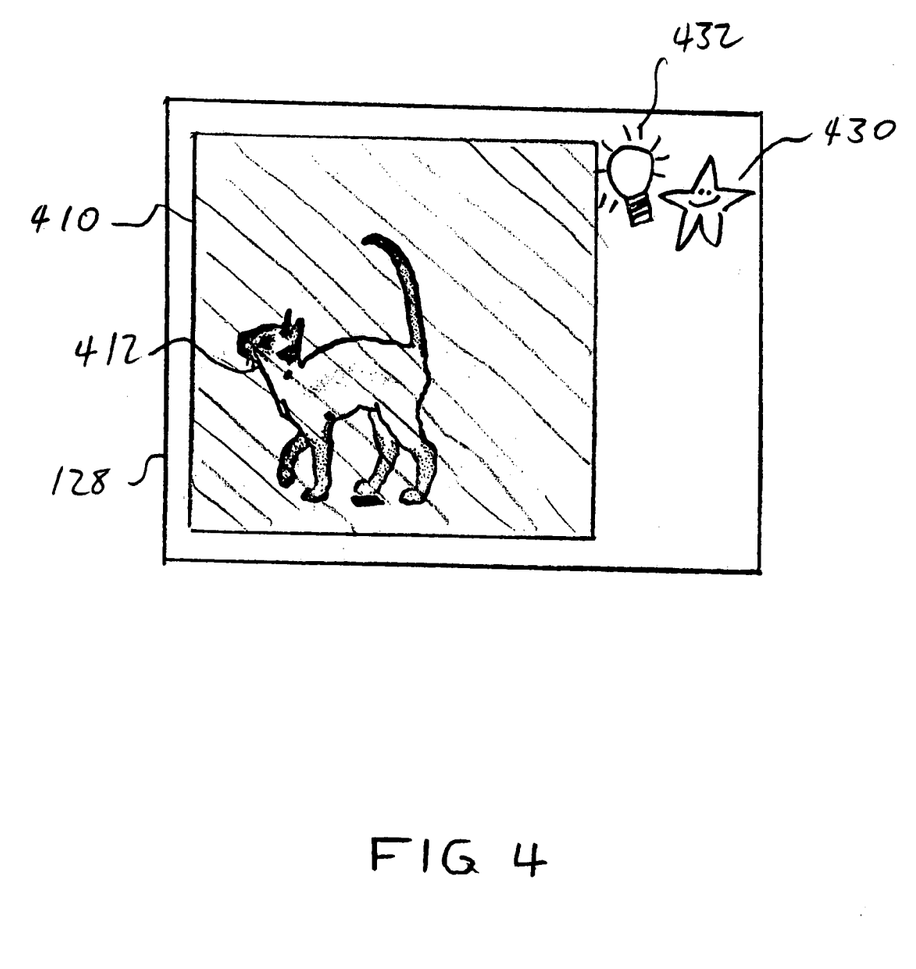
FIG. 4 illustrates an icon demonstrating a brightness correction function on the image, according to one embodiment of the present invention.

Referring now to FIG. 4, an icon demonstrating a brightness correction function on the image is illustrated, according to one embodiment of the present invention. In one embodiment, the image 412 is displayed on the display screen 128 of monitor 126. In other embodiments, the image 412 could be displayed on the LCD 160 of camera 150.

Exemplary dark image 412 is shown as lacking in brightness. Problem detection software running in personal computer 110 may identify the lack of brightness as a problem, and may task animated icon 430 to bring this situation to the user's attention. For this reason, animated icon 430 is shown proffering a light bulb icon 432, indicating to the user that the brightness function should be executed.

Figure 5:
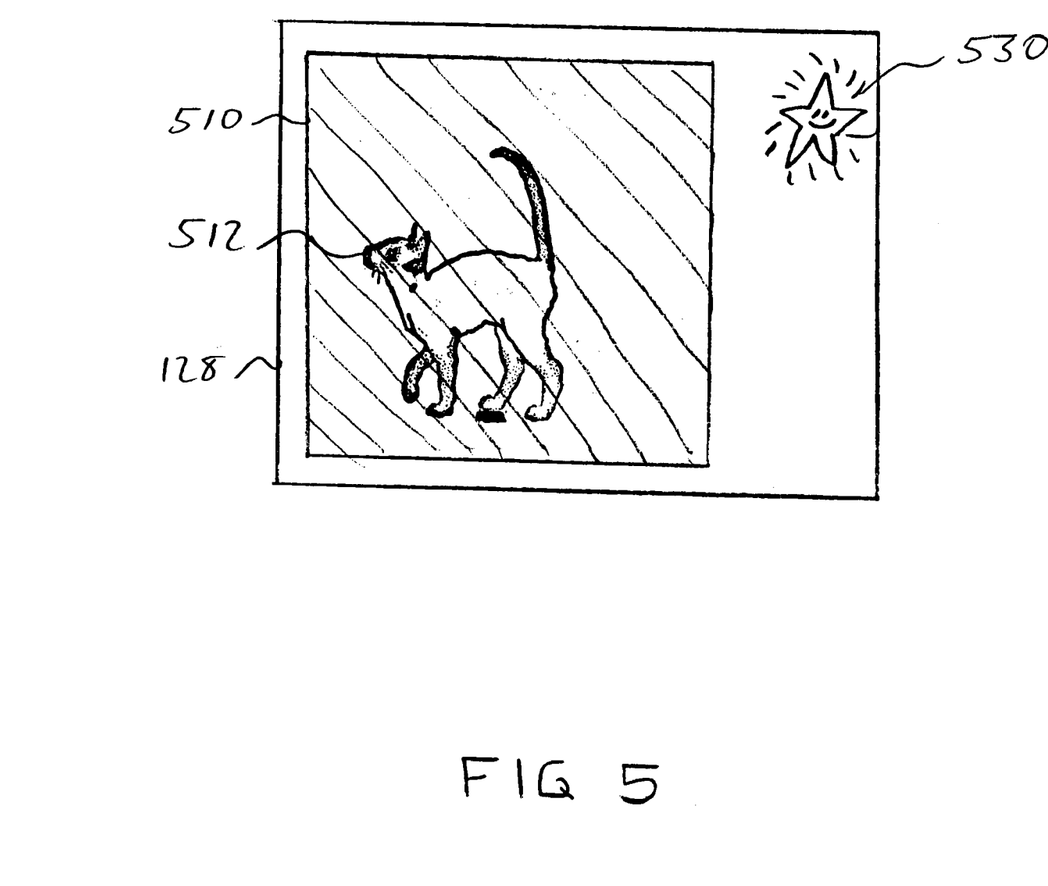
FIG. 5 illustrates an icon demonstrating a brightness correction function by changing the icon's brightness, according to one embodiment of the present invention.

Referring now to FIG. 5, an icon demonstrating a brightness correction function by changing the icon's brightness is illustrated, according to one embodiment of the present invention. In the FIG. 4 embodiment, the animated icon 430 would proffer the light bulb icon 432 to indicate that the brightness function should be executed. In contrast, the FIG. 5 embodiment uses animated icon 530 where animated icon 530 can change from bright to dark and back again continuously to indicate that the brightness function should be executed on dark image 512.

Figure 6:
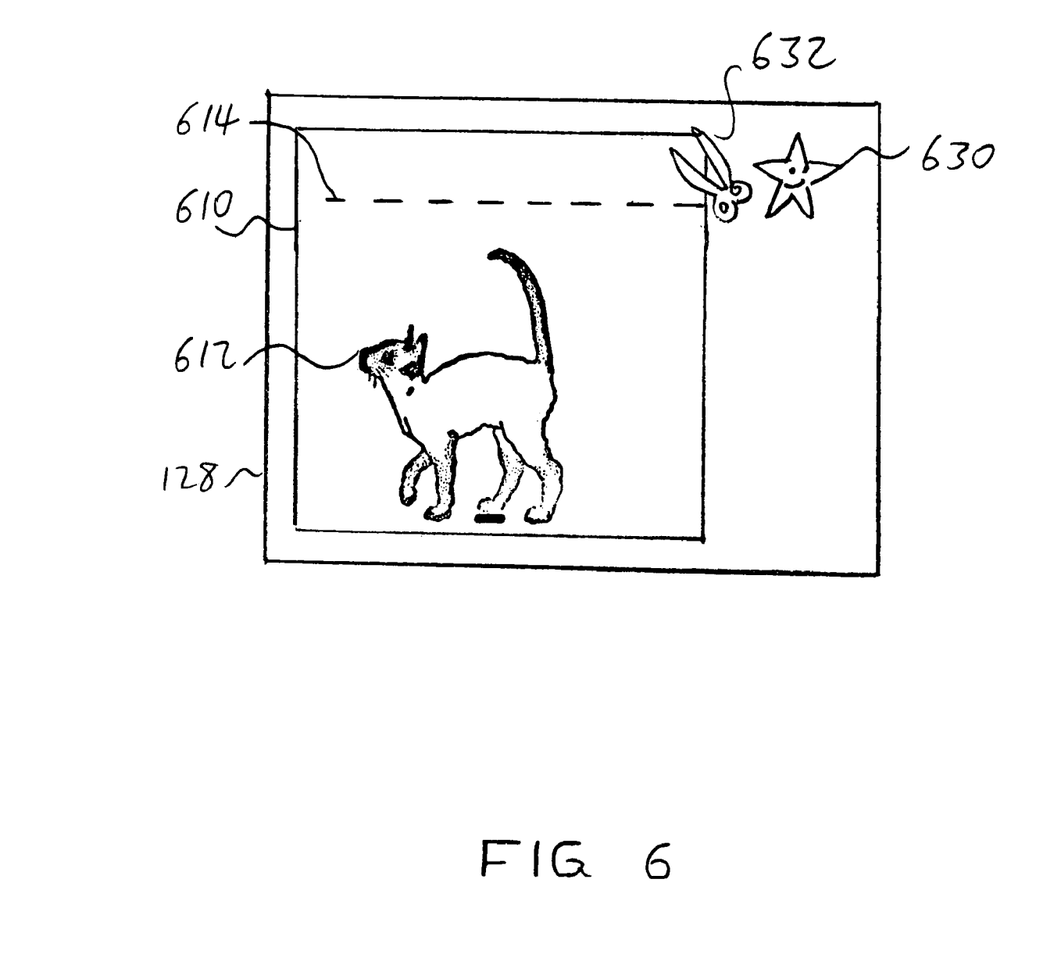
FIG. 6 illustrates an icon demonstrating a cropping function by showing scissors and cut lines on the image, according to an embodiment of the present invention.

Referring now to FIG. 6, an icon demonstrating a cropping function by showing scissors and cut lines on the image is illustrated, according to an embodiment of the present invention. Exemplary image 612 requires cropping at the indicated cut line 614. Problem detection software running in personal computer 110 may identify the compositional flaws of image 612, and task animated icon 630 to bring this situation to the user's attention. For this reason, animated icon 630 is shown proffering a scissors icon 632, indicating to the user that the cropping function should be executed. The scissors icon 632 may be making a cutting motion to make clear the need for cropping.

Figure 7:
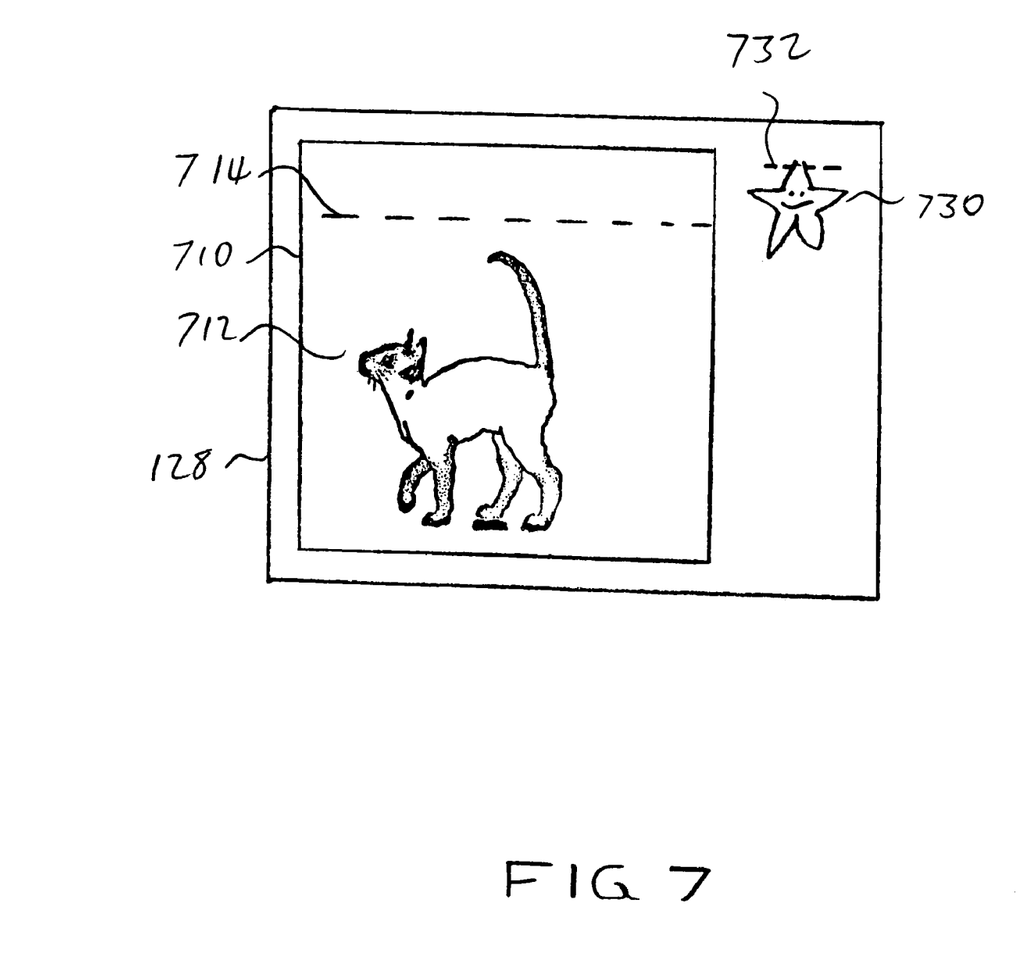
FIG. 7 illustrates an icon demonstrating a cropping function by showing a cropped icon and cut lines on the image, according to an embodiment of the present invention.

Referring now to FIG. 7, an icon demonstrating a cropping function by showing a cropped icon and cut lines on the image is illustrated, according to an embodiment of the present invention. In contrast with the FIG. 6 embodiment, in the FIG. 7 embodiment the animated icon 730 itself is shown as cropped by icon cut line 732. The presence of the animated icon 730 itself indicates to the user that the cropping function should be executed. As a supplemental indicator, cut line 714 may also be displayed.

Figure 8:
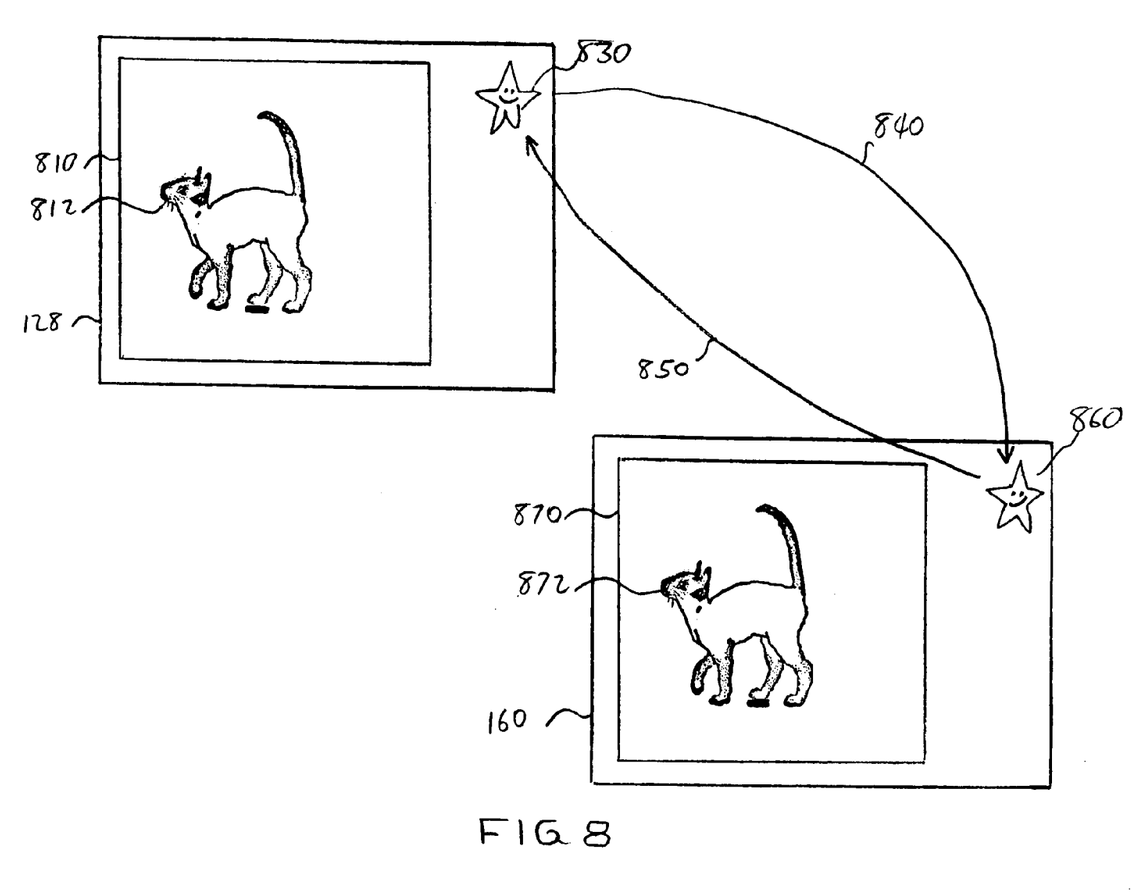
FIG. 8 illustrates an icon traveling between devices, according to one embodiment of the present invention.

Referring now to FIG. 8, an icon traveling between devices is illustrated, according to one embodiment of the present invention. Animated icon 830 is shown on the display screen 128 of monitor 126, and animated icon 860 is shown on the LCD 160 of camera 150. In one embodiment, animated icon 830 is generated by software residing within personal computer 110. In an alternate embodiment, animated icon 830 is generated by a remote server connected via WAN 122. As an example, WAN 122 is the Internet, and animated icon 830 is generated by a Java applet.

Animated icon 830 may be moved 840 to appear as animated icon 860 on LCD 160 across a direct connection, such as exemplary USB 142, or by transportable media, such as exemplary memory card 140. Portable code may be used to generate animated icon, such as a Java applet. The animated icon 860 may have access to differing image-editing functions in the camera than in the personal computer 110. For example, in the brightness example of FIGS. 4 and 5, brightness of the images 412, 512 could be changed by software manipulation. However, animated icon 860 may indicated other solutions to image problems when operating within camera 150. Brightness could be changed by re-shooting the image with a flash attachment, and the animated icon 860 could indicate this alternative.

In alternate embodiments, animated icon 860 could be locally stored and generated within camera 150, and moved 850 to the display screen 128 for personal computer 10 via a direct connection or by transportable media.

Figure 9:
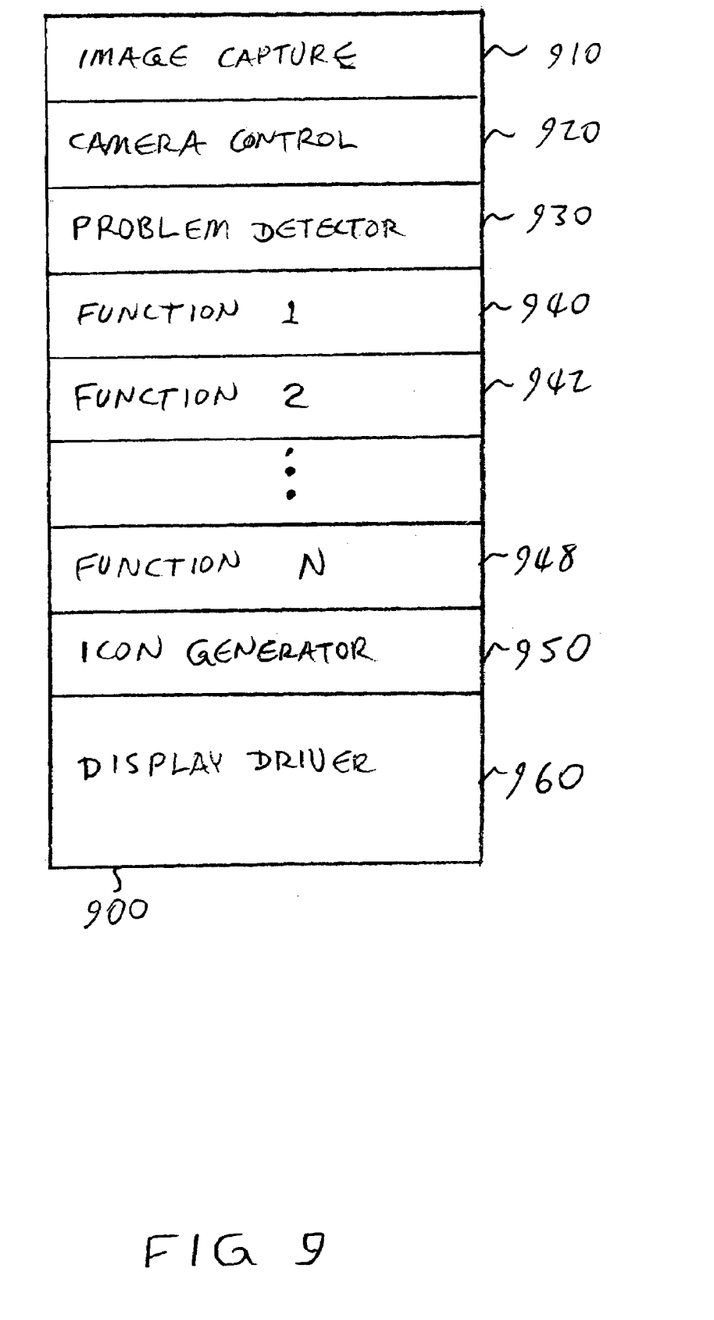
FIG. 9 illustrates a computer software configuration item module diagram, according to one embodiment of the present invention.

Referring now to FIG. 9, a computer software configuration item (CSCI) module diagram is illustrated, according to one embodiment of the present invention. In alternate embodiments, other allocations of functions to modules may be made. Memory area 900 may be in volatile memory, such as RAM, or in non-volatile memory, such as Flash, or in a mixture of the two. In the case where memory area 900 is within a personal computer 110, an image capture module 910 may be used to import photos and other images. In the case where memory area 900 is within a camera 150, a camera control module 920 may be used to take photos and import photos and other images.

Once a photo or other image is within the system including memory area 900, a problem detector module 930 may be invoked. Problem detector module 930 may examine the photo for quality-related problems, such as brightness, overexposure, or improper color balance. The problem detector module 930 may examine the image-processing function modules function 1 940 through function N 948 in order to determine which problems may be solved within the current processing environment. If a match between kind of problem and function module exists, then icon generator 950 produces the animated icon indicating the appropriate remedial action to the user. The display driver 960 may show both the image and the animated icon on the display device.

Figure 10:
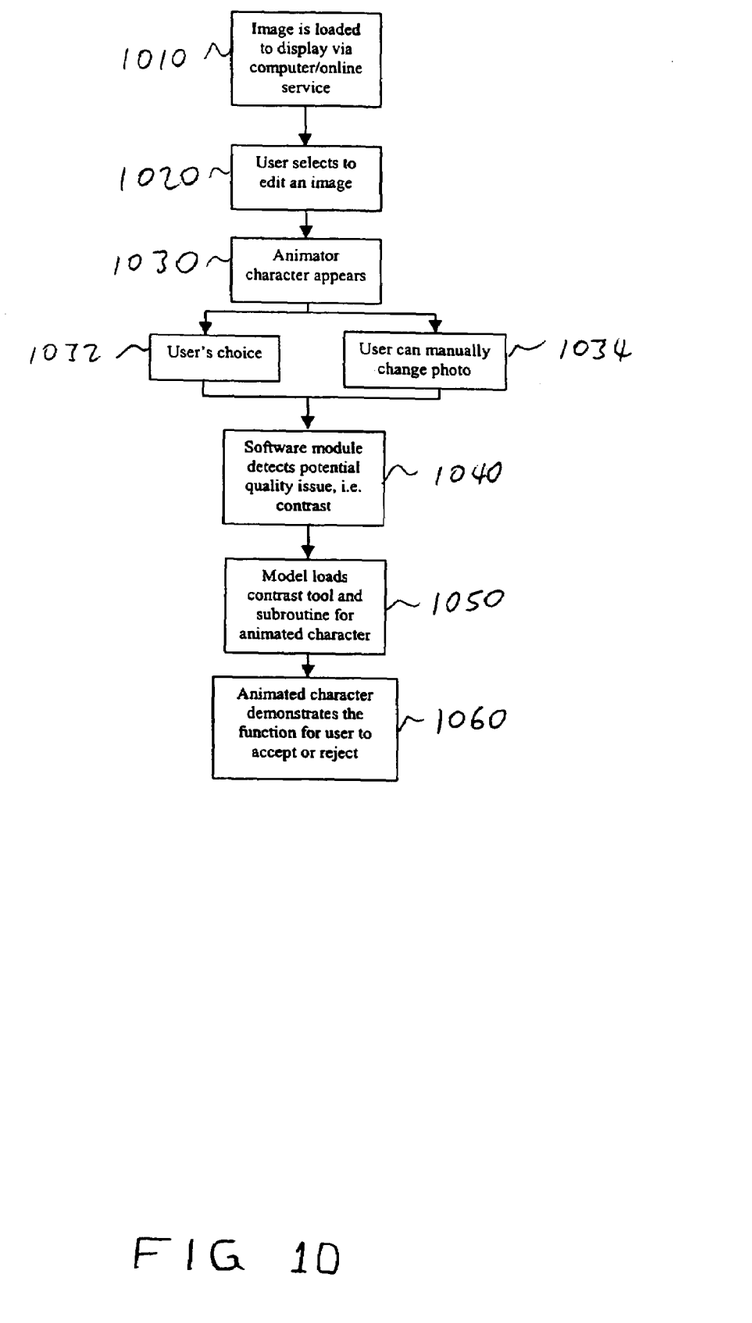
FIG. 10 is a data flow diagram of one embodiment of the present invention.

Referring now to FIG. 10, a data flow diagram of one embodiment of the present invention is illustrated. In alternate embodiments, the order of the procedures shown in FIG. 10 may be changed to any order, and other procedures may be used. In procedure 1010, one or many images are loaded into the image processing computer or camera. The images may be loaded from local storage, from a transportable media or direct connection from a camera, or from a server on a WAN such as an online service. In procedure 1020, the user selects a particular image to edit. The selection of the image initiates procedure 1030, where the animated icon is generated and displayed. Then the user may either decide, in procedure 1032, to let the software guide their editing, or may decide, in procedure 1034, to perform some of the procedures manually. In either case, at procedure 1040 the software problem detector detects quality-related problems with the image. In one example, the problem is bad contrast. For problems with a software corrective function, the appropriate function is initiated (e.g. the contrast function) at procedure 1050, and the animated icon is directed to indicate the suggested use of the tool to the user at procedure 1060.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method for indicating suggested user responses, comprising:
    loading an image into a first image-editing equipment;
    determining a set of quality-related problems of said image using software; and
    displaying at least a first and second animated icons in conjunction with said image, said second animated icon indicating a suggested user response to one of said set of quality-related problems with said image, at least said first animated icon being adapted for exchange between said first image-editing equipment to a second image-editing equipment.

2. The method of claim 1, wherein determining includes matching a corrective function within said software with one of said set of quality-related problems.

3. The method of claim 2, wherein said indicating includes indicating said suggested user response in response to said matching.

4. The method of claim 1, wherein said indicating of the suggested user response includes proffering a tool icon by at least one of said plurality of animated icons.

5. The method of claim 1, wherein said indicating includes performing a related editing to at least one of said plurality of animated icons.

6. The method of claim 1, further comprising moving said plurality of animated icons to said second image-editing equipment.

7. The method of claim 1, wherein said displaying includes loading said plurality of animated icons from a remote server showing banner advertisements that trigger payments to said remote server of said banner advertisements.

8. The method of claim 1, wherein said displaying includes loading said plurality of animated icons from a remote server where a user payment on a per-transaction basis is made.

9. The method of claim 1, wherein prior to loading said image, the method further comprising receiving said first animated icon from said second image-editing equipment.

10. The method of claim 9, wherein said first animated icon is generated by said second image-editing equipment.

11. The method of claim 1, wherein at least one of the first image-editing equipment and the second image-editing equipment is a computer.

12. The method of claim 1, wherein at least one of the first image-editing equipment and the second image-editing equipment is a camera.

13. A system for editing images, comprising:
a first image-editing equipment to load an image;
a software module within said first image-editing equipment to determine a set of quality-related problems of said image;
a first animated icon displayed in conjunction with said image;
a second animated icon to indicate a suggested user response to one of said set of quality-related problems, said second animated icon being displayed in conjunction with said first animated icon and said image; and
a second image-editing equipment to receive at least said first animated icon from said first image-editing equipment.

14. The system of claim 13, wherein said software module performs a match of one of a set of corrective function modules with one of said set of quality-related problems.

15. The system of claim 14, wherein said second animated icon is a tool icon.

16. The system of claim 14, wherein said first animated icon is loaded from a remote server showing banner advertisements that trigger payments to said remote server of said banner advertisements.

17. The system of claim 13, wherein at least one of the first image-editing equipment and the second image-editing equipment is a computer.

18. The system of claim 13, wherein at least one of the first image-editing equipment and the second image-editing equipment is a camera.

19. A wide area network having stored thereon instructions for indicating suggested user responses, which, when downloaded from the wide area network and executed by a processor, cause the processor to perform the following:
loading an image and at least a first animated icon into a first image-editing equipment from a second image-editing equipment;
determining a set of quality-related problems of said image using software;
displaying said first animated icon in conjunction with said image; and
displaying a second animated icon in conjunction with said first animated icon to indicate a suggested user response to one of said quality-related problems with said image.

20. A system comprising:
means for loading an image into a first image-editing equipment;
means for determining a set of quality-related problems of said image using software;
means for displaying a plurality of animated icons in conjunction with said image;
means for indicating a suggested user response to one of said set of quality-related problems by one of said plurality of animated icons; and
means for moving at least one of said plurality of animated icons to a second image-editing equipment.

21. The system of claim 20, wherein said means for indicating includes means for indicating said suggested user response in response to matching a corrective function within said software with one of said set of quality-related problems.

22. The system of claim 20, wherein said means for displaying includes means for loading one of said plurality of animated icons from a remote server.

23. A method for indicating suggested user responses, comprising:
generating a plurality of animated icons on a first image-editing equipment; and
sending at least a first animated icon of said plurality of animated icons to a second image-editing equipment, said first animated icon being used in cooperation with a second animated icon of said plurality of animated icons for indicating a suggested user response to one of a set of software determined quality-related problems of an image loaded into said second image-editing equipment.

24. The method of claim 23, further comprising determining a set of quality-related problems of said image by said second image-editing equipment using software, wherein said determining includes matching a corrective function within said software with one of said set of quality-related problems.

25. The method of claim 24, further comprising indicating said suggested user response by said second image-editing equipment, wherein said indicating includes indicating said suggested user response in response to said matching.

26. The method of claim 23, further comprising indicating said suggested user response by said second image-editing equipment, wherein said indicating includes indicating said suggested user response by proffering a tool icon as said second animated icon by said first animated icon.

27. The method of claim 23, further comprising indicating said suggested user response by said second image-editing equipment, wherein said indicating includes performing a related editing to said first animated icon.

28. The method of claim 23, further comprising receiving said first animated icon from said second image-editing equipment.

29. The method of claim 23, wherein at least one of the first image-editing equipment and the second image-editing equipment is a computer.

30. The method of claim 23, wherein at least one of the first image-editing equipment and the second image-editing equipment is a camera.

31. A machine-readable medium having stored thereon instructions for indicating suggested user responses, which, when executed by a processor, cause the processor to perform the following:
generating an animated icon on first image-editing equipment;
displaying a plurality of animated icons including said animated icon to indicate a suggested user response to a set of software determined quality-related problems of an image; and
sending at least said animated icon to second image-editing equipment, said animated icon for indicating said suggested user response to a said one of said set of software determined quality-related problems of said image loaded into said second image-editing equipment.

32. The machine readable medium of claim 31, wherein said first image-editing equipment determines a set of quality-related problems of said image using software by matching a corrective function within said software with one of said set of quality-related problems.

33. The machine readable medium of claim 32, wherein said first image-editing equipment indicates said suggested user response in response to said matching.

34. The machine readable medium of claim 31, wherein said plurality of animated icons includes said animated icon and a tool icon proffered by said animated icon.

35. The machine readable medium of claim 31, wherein said second image-editing equipment indicates said suggested user response by performing a related editing to said animated icon.

36. The machine readable medium of claim 31, having stored thereon instructions for indicating suggested user responses, which, when executed by the processor, cause the processor to further perform receiving said animated icon from said second image-editing equipment.

37. An apparatus implemented in a first image-editing equipment for indicating suggested user responses, comprising:
- means for receiving an image and at least one animated icon from a second image-editing equipment,
- means for determining a set of quality-related problems of said image using software, said means for determining includes matching a corrective function within said software with one of said set of software determined quality-related problems; and
- means for generating a plurality of animated icons, at least one of said plurality of animated icons for indicating a suggested user response to said one of said set of software determined quality-related problems of said image.

38. The apparatus of claim 37, wherein said at least one of said plurality of animated icons indicating said suggested user response in response to said matching.

39. The apparatus of claim 37, wherein said at least one of said plurality of animated icons being a tool icon proffered by a first animated icon of said plurality of animated icons.

40. The apparatus of claim 37, wherein the second image-editing equipment is a computer.

41. The apparatus of claim 37, wherein the second image-editing equipment is a camera.

42. A photo-editing system operating as a first image-editing equipment, comprising:
- an input/output interface;
- a processor coupled to a memory through a bus; and
- a system process executed by the processor from the memory to cause the processor to load an image and at least one animated icon from a second image-editing equipment via said input/output interface of said first image-editing equipment, determine a set of quality-related problems of said image using software, and display a plurality of animated icons including said at least one animated icon in conjunction with said image to visually indicate a suggested user response to one of said set of quality-related problems with said image.

43. The system of claim 42, wherein the system process executed by the processor from the memory further causes the processor to match a corrective function within said software with one of said set of quality-related problems.

44. The system of claim 43, wherein the system process executed by the processor from the memory further causes the processor to indicate said suggested user response in response to said matching.

45. The system of claim 42, wherein the system process executed by the processor from the memory further causes the processor to indicate said suggested user response by proffering a tool icon as one of said plurality of animated icons.

46. The system of claim 42, wherein the system process executed by the processor from the memory further causes the processor to move said plurality of animated icons to said second image-editing equipment.

47. The system of claim 46, wherein said plurality of animated icons are generated by said second image-editing equipment.

48. The system of claim 42 being is located within a camera.

49. The system of claim 42, wherein the input/output interface is a Universal Serial Bus (USB) interface.

50. The system of claim 42, wherein the second image-editing equipment is a computer.

51. The system of claim 42 being a computer including the software process being an image-editing software module.

52. A photo-editing system operating as a first image-editing equipment, comprising:
- a processor coupled to a memory through a bus; and
- a system process executed by the processor from the memory to cause the processor to generate a plurality of animated icons for display on the first image-editing equipment, and send at least one of said plurality of animated icons to a second image-editing equipment, said at least one of said plurality of animated icons for indicating a suggested user response to one of a set of software determined quality-related problems of an image loaded into said second image-editing equipment.

53. The system of claim 52, wherein said system process to determine a set of quality-related problems of said image using software by matching a corrective function within said software with one of said set of quality-related problems.

54. The system of claim 53, said system process to indicate said suggested user response in response to said matching.

55. The system of claim 52, said system process to indicate said suggested user response by proffering a tool icon by said at at least one of said plurality of animated icons.

56. The system of claim 52, said system process to indicate said suggested user response by performing a related editing to said at least one of said plurality of animated icons.

57. The system of claim 52, wherein the system process executed by the processor from the memory further causes the processor to receive said at least one of said plurality of animated icons from said second image-editing equipment.

58. The system of claim 52, wherein the system is located within a camera.

59. The system of claim 52, wherein the second image-editing equipment is a computer.

60. The system of claim 52 being a computer including the software process being an image-editing software module.

* * * * *